United States Patent [19]

Yoshida

[11] Patent Number: 4,965,715
[45] Date of Patent: Oct. 23, 1990

[54] DATA FLOW TYPE INFORMATION PROCESSOR

[75] Inventor: Shinichi Yoshida, Nara, Japan

[73] Assignee: Sharp Kabushiki Kaisha, Osaka, Japan

[21] Appl. No.: 299,610

[22] Filed: Jan. 23, 1989

[30] Foreign Application Priority Data

Jan. 23, 1988 [JP] Japan .................................. 63-13452

[51] Int. Cl.$^5$ .............................................. G06F 13/00
[52] U.S. Cl. ............................... 364/200; 364/232.22; 364/261.3; 364/262; 364/252.3
[58] Field of Search ... 364/200 MS File, 900 MS File

[56] References Cited

U.S. PATENT DOCUMENTS

| 4,145,733 | 3/1979 | Misunas et al. | 364/200 |
|---|---|---|---|
| 4,153,932 | 5/1979 | Dennis et al. | 364/200 |
| 4,156,903 | 5/1979 | Barton et al. | 364/200 |
| 4,591,979 | 5/1986 | Iwashita | 364/200 |
| 4,675,806 | 6/1987 | Uchida | 364/200 |
| 4,841,436 | 6/1989 | Asano et al. | 364/200 |

OTHER PUBLICATIONS

Watson et al., "A Practical Data Flow Computer", Computer, Feb. 1982, pp. 51-57.
Srini, Vason P., "An Architectural Comparison of Dataflow Systems", Computer, Mar. 1986, pp. 68-88.

Primary Examiner—Gareth D. Shaw
Assistant Examiner—Rebecca L. Rudolph

[57] ABSTRACT

Data packet circulates in the order of program storing portion, data pair producing portion and operation processing portion, so that operation processing based on the data flow program stored in the program storing portion progresses. Priority information is applied in advance to the data flow program stored in the program storing portion. If hash collision occurs in the data pair producing portion, the data pair producing portion determines priority for data pair production processing in accordance with the priority information, so that data pair production processing is first formed with respect to the data packet having higher priority.

5 Claims, 6 Drawing Sheets

DATA FLOW TYPE INFORMATION PROCESSOR

BACKGROUND OF THE INVENTION

1. Field of the Invention

The present invention relates generally to data flow type information processors, and more particularly, to a data flow type information processor for processing data in accordance with a data flow program.

2. Description of The Prior Art

In a conventional von Neumann computer, various instructions as programs are stored in advance in a program memory, and addresses in the program memory are sequentially specified by a program counter so that the instruction are sequentially read out, whereby the instruction are executed.

On the other hand, a data flow type information processor is a kind of a non-von Neumann computer having no concept of sequential execution of instruction by a program counter. Such a data flow type information processor employs architecture based on parallel processing of instructions. In the data flow type information processor, immediately after data to be objects of an operation are collected, an instruction can be executed, and a plurality of instructions are simultaneously driven by the data, so that programs are executed in parallel in accordance with natural flow of the data. As a result, it is considered that the time required for the operation is significantly reduced.

FIG. 1 is a block diagram showing one example of a structure of a conventional data flow type information processor, and FIG. 2 is a diagram showing one example of field structure of a data packet processed by the information processor.

The data packet shown in FIG. 2 comprises a through packet flag, a color field, a destination field, an instruction field, a data 1 field, and a data 2 field. The color field stores color information, the destination field stores destination information, the instruction field stores instruction information, and the data 1 field or the data 2 field stores operand data.

The information processor shown in FIG. 1 comprises a program storing means 1, a data pair producing means 2, and a processing means 3. The program storing means 1 contains a program memory (not shown) in which the data flow program comprising the destination information and the instruction information, as shown in FIG. 3, are stored. The program storing means 1 reads out the destination information and the instruction information in the data flow program, by addressing based on destination information in an inputted data packet; stores the destination information and the instruction information in the destination field and the instruction field in the data packet, respectively; and outputs that data packet. The data pair producing means 2 queues the data packet outputted from the program storing means 1. More specifically, the data pair producing means 2 detects different two data packets having the same color information and destination information; stores operand data in one of the data packets, for example, the content of the data 1 field shown in FIG. 2, in the data 2 field in the other data packet; and outputs the other data packet. At that time, the above described one data packet disappears. The processing means 3 decodes the instruction information in the data packet outputted from the data pair producing means 2 and performs processing based on the decoded instruction information with respect to the two operand data in the data packet. Then, the result of the processing is stored in the data 1 field, for example, in the data packet and the data packet is outputted to the program storing means 1.

Meanwhile, the program storing means 1 and the data pair producing means 2 are coupled to each other by two data transmission paths 4 and 5. The data transmission paths 4 and 5 are coupled to two input ports of the data pair producing means 2. The data packet outputted from the program storing means 1 is selectively inputted to either one of the input ports of the data pair producing means 2, depending on whether the operand data is a right operand data or a left operand data in the processing. In addition, the data pair producing means 2 and the processing means 3 are coupled to each other by a transmission path 6, and the processing means 3 and the program storing means 1 are coupled to each other by a transmission path 7.

The data packet circulates through the program storing means 1, the data pair producing means 2, and the processing means 3 in that order, so that the processing based on the data flow program stored in the program storing means 1 progresses.

The data pair producing means 2 detects paired data based on a so-called template matching scheme. Conventionally, such template matching scheme using a matching memory such as a random access memory (RAM) and a serial access memory (SAM) is known.

As described in the forgoing, when a matching memory is used as the data pair producing means 2, it has been proposed, as seen in papers for lecture in the 34th Meeting in Japan by Information Processing Association, 2Q-7, pages 249, 250 (1987), that physical address space of the matching memory can be effectively utilized by using, as an address, value which is obtained by applying hash operation to the color information stored in the color field and the destination information stored in the destination field shown in FIG. 2, for access to the matching memory. In a system of accessing a matching memory by the hashed address (simply referred to as "hash address" hereinafter), it is likely that execution of processing could not continue because accessing contention occurs with respect to a plurality of different data having the same hash address (referred to as "hash collision" hereinafter). Then, "a data exchanging system" is proposed as measure for hash collision in the above described paper. In this data exchanging system, the data pair producing means 2 performs the following operations (1) to (6). In this connection, it is assumed that all of the presence bits (PB) of the data in the matching memory shown in FIG. 4 are set to "invalid" before execution of the data flow program starts.

(1) A hash operation is applied to the color information and the destination information in an input data packet shown in FIG. 2, and by using the obtained value as an address, the data shown in FIG. 4 is read out from the matching memory.

(2) If and when the presence bit (PB) in data read out from the matching memory is "invalid", the color information, the destination information and the contents in the data 1 field in the input data packet are written into the matching memory in accordance with the hash address and the PB is set to "valid", so that the processing is terminated. On the other hand, if the PB in the data read out from the matching memory is "valid", the processing in the following (3) is performed.

(3) The numerical value represented by the color information and the destination information in the input data packet is compared with a numerical value represented by the color information and the destination information in the data read out from the matching memory, and if the numerical value in the input data packet is larger than that from the matching memory, the following processing (4) is performed; if smaller, the following processing (5) is performed; and if both are coincident with each other, the following processing (6) is performed.

(4) A through packet flag in the input data packet shown in FIG. 2 is set to "valid", and then, is sent out from the data pair producing means 2, so that the processing is terminated.

(5) Based on the data read out from the matching memory, a new data packet is produced, and, in addition, a through packet flag in the newly produced data packet is set to "valid" and then is sent out to the processing means 3. Color information, destination information, instruction information and a content in the data 1 field in the input data packet are written into an area of the matching memory designated by a hash address and then the processing is terminated.

(6) A data pair is produced by combining the contents in the data field in the input data packet (one operand data) with the content in the data field read out from the matching memory (the other operand data), and, in addition, a new data packet is produced by adding to the data pair the contents of color information, destination information and instruction information in the input data packet. Then, a through packet flag in the newly produced data packet is set to "invalid" and then sent out to the processing means 3. Furthermore, the PB in the area of the matching memory designated in the hash address is set to "invalid", so that the processing is terminated.

Meanwhile, the data packet having a "valid" through packet flag, which is sent out from the data pair producing means 2, passes through the processing means 3 and the program storing means 1, without being processed in the processing means 3 and the storing means 1, and returns to the data pair producing means 2 where the above described processing is repeated.

FIG. 5 is a diagram describing in a symbolized manner an example of the data flow program. In FIG. 5, the reference characters N1 and N2 denote two-input and one-output operation node, D1 and D2 denote destination information of input data packets to the respective nodes N1 and N2. The dotted line in the figure indicates depending relation of the data. More particularly, in the figure, the output of the node N1 leads to the left input of the node N2, so that the left input of the node N2 depends on the output of the node N1. It should be noted, however, that there is no data depending relation between the output of the node N1 and the right input of the node N2. Solid circles P1L and P2R in the figure indicate that production of the input data packet to each node is completed. More particularly, in the figure, production of the input data packet P1L to the left input of the node N1 and production of the input data packet P2R to the right input of the node N2 have been completed. In other words, data packet P1L, for example, is produced by reading out the destination information D1 of the node N1 and the instruction information from the program storing means 1, and is waiting for arrival of a data packet P1R to be one of a pair of data in the data pair producing means 2.

For simplicity of explanation, the contents of the color information in the input data packet to the nodes N1 and N2 in FIG. 5 are assumed to be the same. In FIG. 5, the same hash address is produced from the destination information D1 and D2 and, if D1>D2 in value of the contents, the content in the data packet P2R is eventually written into the matching memory in the data pair producing means 2 based on the above described "data exchanging system", without relying on the order of producing the data packets P1L and P2R. On the other hand, the data packet P1L is sent out from the data pair producing means 2, with the through packet flag being set to "valid", and continues to circulate in the information processor shown in FIG. 1 until the data pair to the node N2 is produced. It is noted that the data pair to the node N2 is produced when the input data packet P2L to the left input of the node N2 is produced and inputted to the data pair producing means 2. Then, the data packet P2L is produced, after an operation with respect to the node N1 is executed based on the data depending relation between the nodes N1 and N2, that is, after the data pair for the node N1 is produced. However, since the data packet P2R has been written into the matching memory of the data pair producing means 2, production of the pair to the node N1 can never occur before the data pair to the node N2 is produced.

From the foregoing, it should be appreciated that in the circumstances shown in FIG. 5, deadlock occurs if and when the contents of the color information in the input data packets to the nodes N1 and N2 coincide with each other, the contents D1 and D2 in the destination fields produce the same hash address, and D1 is larger than D2 in value of the contents. Concerning this problem, the above described paper indicates a method of avoiding deadlock caused due to hash collision, by limiting a method of setting destination information in the input data packet, that is, a node number. More particularly, the above described paper proposed that considering any of two-input and one-output nodes having data depending relation in the data flow program, node numbers are set so that destination information of the node to which production of data pair is to be first performed can be always made smaller. For example, in the example shown in FIG. 5, based on the data depending relation, the destination information, that is, the node number is set so that the relation of D1<D2 can be established.

If and when the data flow program to be executed contains no loop structure, deadlock caused due to hash collision can be avoided by adopting the scheme described in the above described paper. However, if the data flow program contains a loop structure, it is likely that the deadlock caused due to hash collision may occur even if the scheme in the above described paper is adopted. FIG. 6 shows an example of a data flow program containing a loop structure. In this figure, the meaning of the reference characters N3, N4, D3, D4 and the solid circle marks P3L and P4R, and the meaning of dotted line are the same those in FIG. 5. In addition, solid square mark P3r in the FIG. 6 indicates a path from an output of the node N3 to the right input of the node N3, that is, an input of any of node group constituting a loop. The P3R becomes eventually a right input data packet P3R of the node N3 as a result of progress of processing. For simplicity of explanation, it is assumed that color information of P3L, P4R and P3r are the same. FIG. 6 shows a circumstance where the right input data packet P4R to the node N4 has being inputted to the data pair producing means 2 before the input data pair to the node N3 is produced. In FIG. 6, the same hash address is produced from the destination information D3 and D4 in the input data packet to the nodes N3 and N4 and, if D3>D4 in value of the contents thereof, deadlock caused due to hash collision occurs on the same ground as that in the case of D1>D2 in FIG. 5. In addition, if, in the data flow program shown in FIG. 6, the same hash address is produced from the destination information D3 and D4 in the input data packet to the nodes N3 and N4, it is possible that the input data packet to the right input of the node N3 is written into the matching memory of the data pair producing means 2, so that deadlock occurs, even if D3<D4, because the nodes N3 and N4 in the data flow program have relation depending on each other.

From the foregoing, it should be appreciated that if a data flow program containing a loop structure is executed, deadlock caused due to hash collision can not the avoided only by the scheme shown in the above described paper.

SUMMARY OF THE INVENTION

Accordingly, an object of the present invention is to provide a data flow type information processor which can eliminate the above described problems and can avoid deadlock even if data flow program containing a loop structure is executed.

Briefly stated, the present invention is directed to a data flow type information processor comprising program storing means, matching memory, data pair producing means and processing means, wherein priority information is provided in advance to the data flow program stored in the program storing means, so that when hash collision occurs in the data pair producing means, priority for data pair producting processing is determined in accordance with the priority information and data pair producting processing is first performed with respect to the data packet having higher priority.

In accordance with the present invention, an execution can be ensured without deadlock, even in the data flow program containing a loop structure which conventionally caused deadlock so that continuations of further processing is impossible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
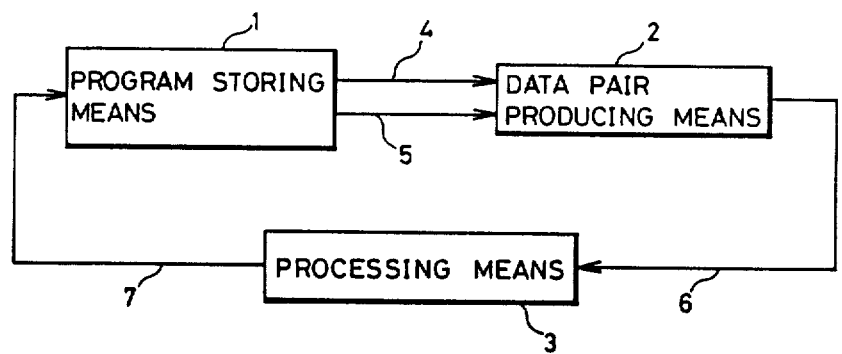
FIG. 1 is a block diagram showing an example of a conventional data flow type information processor.
Figure 2:
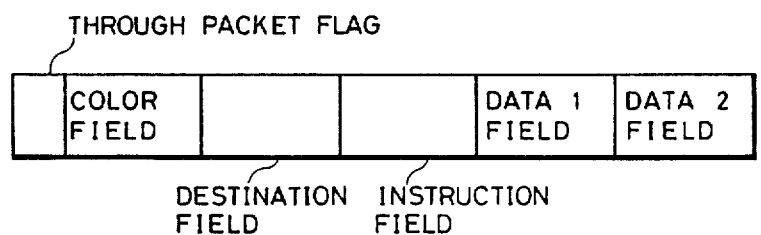
FIG. 2 is a diagram showing a field structure of a data packet to be processed in the conventional data flow type information processor shown in FIG. 1.
Figure 3:
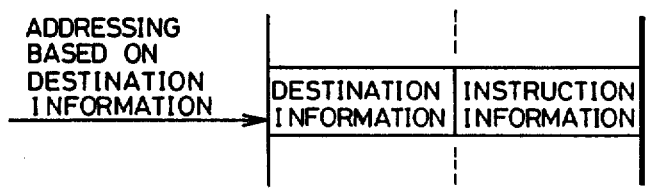
FIG. 3 is a diagram showing a portion of storage contents in the program storing means in FIG. 1.
Figure 7:
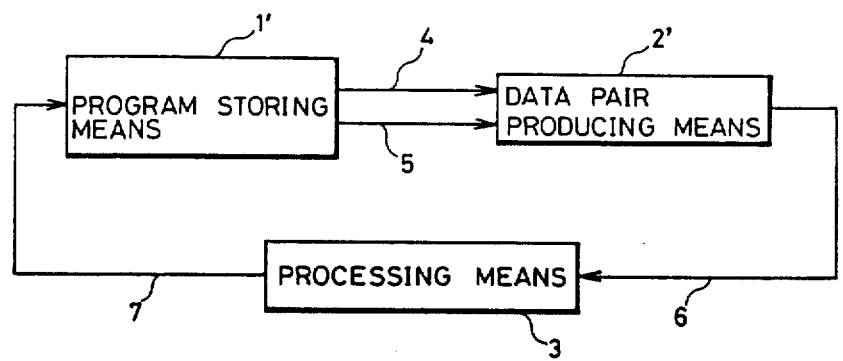
FIG. 7 is a diagram showing a structure of a data flow type information processor of one embodiment of the present invention.
Figure 8:
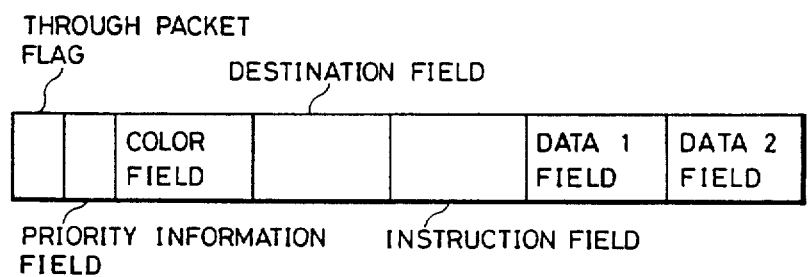
FIG. 8 is diagram showing a field structure of a data packet processed in the FIG. 7 embodiment.
Figure 9:
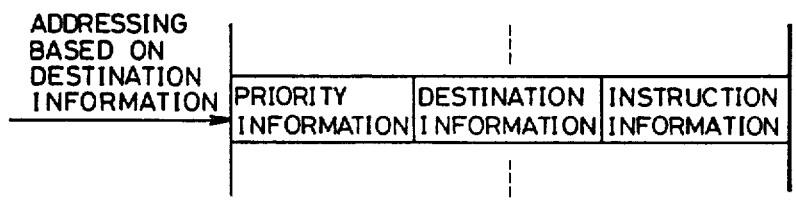
FIG. 9 is a diagram showing a portion of storage content of the program storing means in FIG. 7.

FIG. 7 is a block diagram showing a structure of a data flow type information processor of one embodiment of the present invention. In this embodiment shown in this figure, there are provided program storing means 1' and data pair producing means 2', in place of the program storing means 1 and the pair producing means 2 shown in FIG. 1. The remaining components are the same as those of a conventional data flow type information processor shown in FIG. 1. FIG. 8 is a diagram showing a field structure of a data packet to be processed in the data flow type information processor shown in FIG. 7. The field structure of the data packet in FIG. 8 comprises a field structure of a data packet in the conventional processor in FIG. 2, plus a priority information field. A priority information indicating that the data packet is to be executed for processing on a priority basis in the data pair producing means 2' FIG. 9 shows a field structure of a data flow program stored in the program storing means 1' in the embodiment. The field structure of the data flow program in FIG. 9 comprises a field structure of a data flow program in the conventional apparatus shown in FIG. 3, plus a priority information indicating that the data packet is to be executed for processing on priority basis in the data pair producing means 2'.

Figure 4:
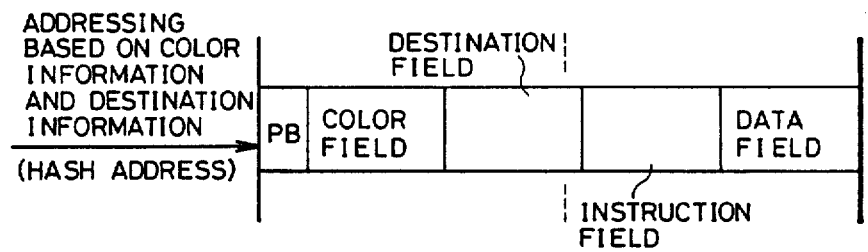
FIG. 4 is a diagram showing a portion of storage contents in a matching memory in a data pair producing means in FIG. 1.
Figure 5:
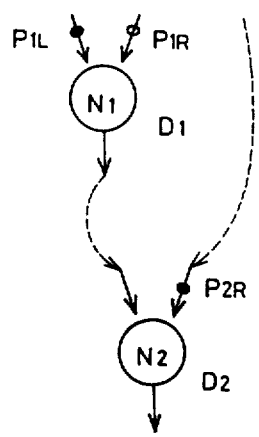
FIG. 5 is a diagram describing in a symbolized manner an example of a data flow program.
Figure 6:
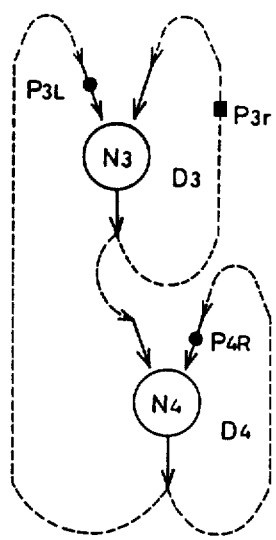
FIG. 6 is a diagram describing in a symbolized manner an example of a data flow program containing a loop structure.
Figure 10:
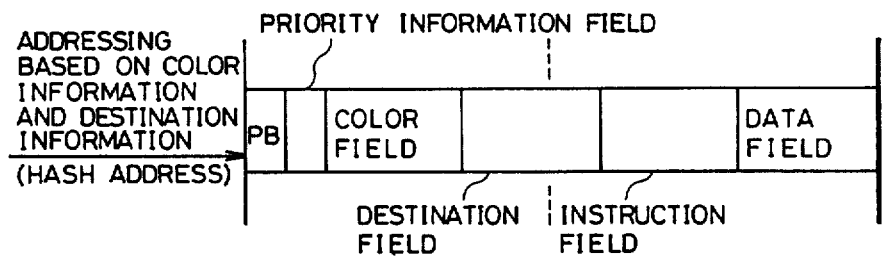
FIG. 10 is a drawing showing a portion of storage contents in a matching memory of the data pair producing means in FIG. 7.

FIG. 10 shows a field structure of a stored data in a matching memory included in the data pair producing means 2 in the embodiment. The field structure in FIG. 10 comprises a field structure of a stored data in the matching memory in the conventional apparatus shown in FIG. 4, plus a priority information field which is similar to that of FIG. 8.

The program storing means 1' in this embodiment stores data flow program shown in FIG. 9, reads out the next priority information, the next destination information and the next instruction information by using as address, the color information and destination information in the input data packet, and stores the read information in the corresponding priority information field, destination field and instruction field in the input data packet and outputs that packet. The data pair producing means 2' in this embodiment contains a matching memory (not shown) and performs a queuing processing (processing of detecting two data packets the color information and destination information of which coincide with each other) in accordance with "data exchanging scheme based on priority information" described subsequently, with respect to the data packet outputted form the program storing means 1', so that the data pair is produced. Meanwhile, the function of the processing means 3 in this embodiment is the same as in the conventional information processor.

In the "exchanging scheme based on priority information", the data pair producing means 2' performs the following operations (1) to (7). However, it is assumed that all of the presence bits (PB) of the data (refer to FIG. 9) in the matching memory of the data pair producing means 2' are set to "invalid" before execution of data flow program starts.

(1) Hash operation is applied to the color information and destination information in the input data packet in FIG. 8, and then the data shown in FIG. 10 is read out from the matching memory by using, as address, the obtained value.

(2) If and when the PB in the data read out from the matching memory is "invalid", the contents of color information, destination information and the data 1 field in the input data packet are written into the matching memory in accordance with the hash address and the PB is set to "valid", so that processing is terminated. On the other hand, if the PB in the data read out from the matching memory is "valid", the value represented by the color information and the destination information in the input data packet is compared with the value represented by the color information and the destination information in the data read out from the matching memory and if both are coincident with each other, the following processing (7) is performed and if incoincident, the following processing (3) is performed.

(3) If both of the priority information in the input data packet and the priority information in the data read out from the matching memory are "valid", the following processing (4) is performed. If only the priority information in the data read out from the matching memory is "valid", the following processing (5) is performed. If only the priority information in the input data packet is "valid", the following process (6) is performed.

(4) Value represented by the color information and destination information in the input data packet is compared with the value represented by the color information and destination information in the data read out from the matching memory, and if the value in the input data packet is larger, the following processing (5) is performed and if the value in the input data packet is smaller, then the following processing (6) is performed and if both are coincident with each other, the processing (7) is performed.

(5) A through packet flag in the input data packet is set to "valid" and then, is sent out to the processing means 3, so that processing is terminated.

(6) A new data packet is produced based on the data read out from the matching memory and a through packet flag in the newly produced data packet is set to "valid" and then is sent out to the processing means 3. In addition, the contents of the priority information, color information, destination information, instruction information and data 1 field in the input data packet are written into the matching memory in accordance with the hash address, so that the processing is terminated.

(7) A data pair is produced by combining the content (one operand data) of the data field storing effective data in the input data packet with the content (other operand data) of the data field in the data read out from the matching memory, and, in addition, a new data packet is produced by adding to the data pair a priority information, color information, destination information and instruction information in the input data packet. The through packet flag in the newly produced data packet is set to "invalid" and then is sent out to the processing means 3. Furthermore, the PB in the area of the matching memory designated by hash address is set to "invalid", so that processing is terminated.

Meanwhile, the data packet having a "valid" through packet flag is sent out from data pair producing means 2, in the same manner as in the conventional example, and then passes through the processing means 3 and the program storing means 1' without being processed therein, and returns to the data pair producing means 2' where the above described processing is repeated.

The "data exchange scheme based on priority information" involves a conventional "data exchanging scheme", as clear from the above described processing procedures.

Figure 11:
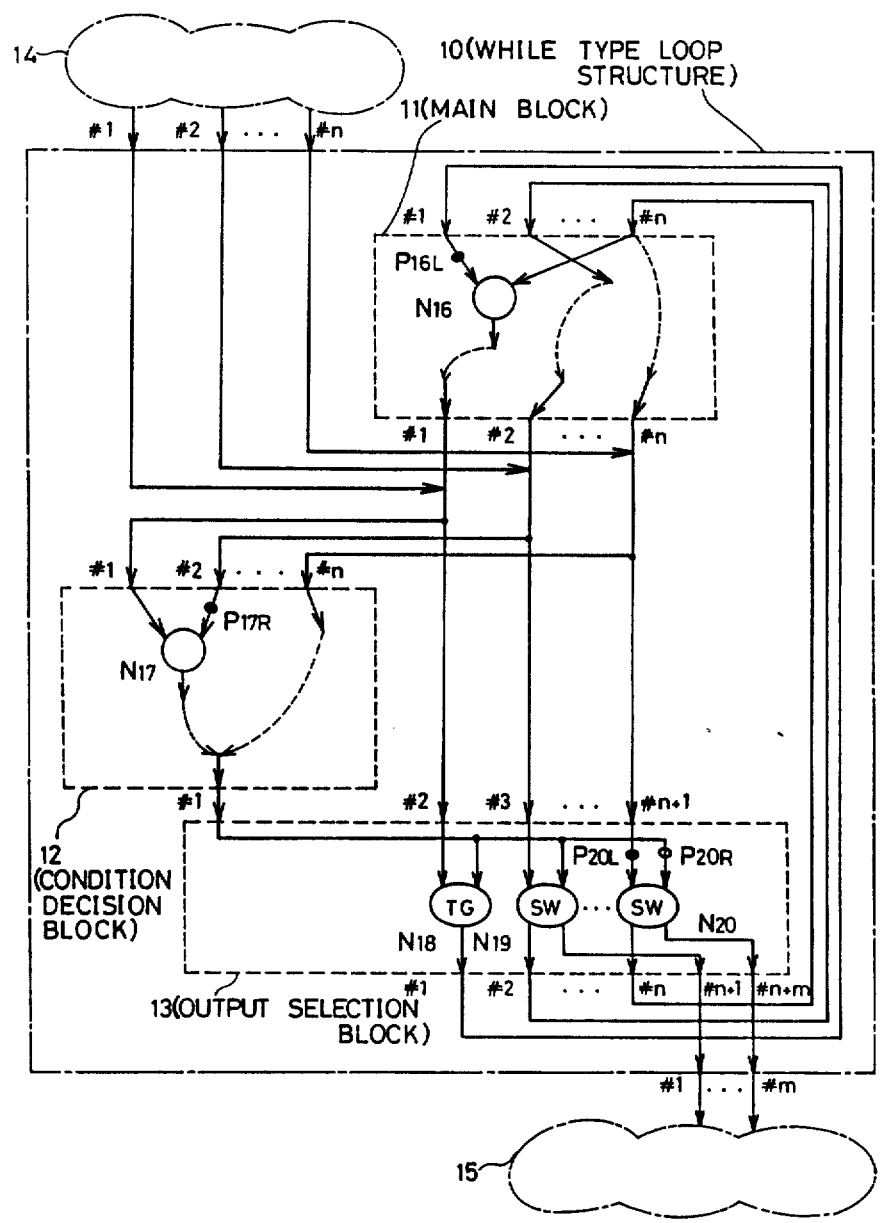
FIG. 11 is a diagram showing a unwound manner of a data flow program having a while type loop structure.

FIG. 11 shows an unwound fashion of data flow program having a while type loop structure, that is, a structure in which termination condition is determined prior to execution of loop processing. In FIG. 11, a while type loop structure 10 comprises n inputs and n outputs. A main block 11 is a main processing portion in a loop structure and comprises n inputs and n outputs. As shown in FIG. 11, it is assumed that in the block 11, data depending relation necessarily exists between corresponding inputs and outputs, that is, inputs and outputs having the same number in inputs number and outputs number. A condition determining block 12 determines termination of a loop based on the input data, so that "truth" output representing continuation of loop processing or "false" outputs representing termination of a loop processing is provided. The condition determining block 12 comprises n inputs and a single output and as shown in FIG. 11, all of the inputs have data depending relation to a single output. An output selecting block 13 selects destination of data in accordance with "truth/false" outputted from the condition determining block 12. The output selecting block 13 comprises (n+1) inputs and (n+m) outputs, and nodes TG and SW. The node TG provides left input data when a right input is "truth" and provides no output when the right inputs is "false". In other words, the node TG is a node absorbing the left input data. The node SW provides the left input data to the left output when the right input is "truth" and provides the left input data to the right outputs when the right input is "false". "Processing prior to execution of loop structure" 14 comprises a group of nodes to be processed prior to execution of a loop structure 10, that is, the group of nodes having data depending relation to inputs of the loop structure 10. In addition, "processing after execution of loop structure" 15 comprises a group of nodes to be processed after execution of the loop structure 10, that is, the group of nodes having data depending relation to the output of the loop structure 10. Meanwhile, it is assumed that there is a connecting relation as shown in FIG. 11, among the main block 11, the condition determining block 12, the output selecting block 13, the "block processing prior to execution of loop structure" 14, and the "processing after termination of loop structure" 15.

In FIG. 11, if the value of destination information for two input nodes belonging to the "processing prior to execution of loop structure" 14 is set to be smaller than the value of the destination information for two input nodes belonging to the loop structure 10, and the value of the destination information for two input nodes belonging to the "processing after termination of loop structure" 15 is set to be larger than the value of the destination information for two input nodes belonging to the loop structure 10, no deadlock caused due to hash collision occurs between the two input nodes belonging to the "processing prior to execution of loop structure" 14 and the two input nodes belonging to the loop structure 10, and between two input nodes belonging to the "processing after termination of loop structure execution" 15 and the two input nodes belonging to the loop structure 10, by adopting the above described "data exchanging scheme".

Then, in FIG. 11, it is assumed that the value of destination information before two input nodes belonging to the main block 11, two input nodes belonging to the condition determining block 12, and two input nodes belonging to the output selecting block 13 are set to become larger in that order of the two input nodes. Since, because of connecting structure of a loop structure 10, the processing of the main block 11 with respect to the next loop stage must be started after termination of processing of the condition determining block 12, deadlock caused due to hash collision never occurs between the two input nodes belonging to the main block 11 and the two input nodes belonging to the condition determining block 12, by adopting the above described "data exchanging scheme". On the other hand, after termination of processing of the condition determining block 12, execution of the two-input nodes TG and SW belonging to the output selecting block 13 is started. In this connection, in FIG. 11, it is assumed that production of data pair to the node N20, for example, is delayed, so that processing of nodes N18 and N19 is proceeded. In such circumstance, if the left input data packet P16L to the node N16 or the right input data packet P17R to the node N17 arrives at the data pair producing means 2' and the same hash address is produced from the destination information for the nodes N20, N16 and N17, it may be possible that deadlock caused due to hash collision occurs between the nodes N20 and N16 and between nodes N20 and N17 in accordance with the above described "data exchanging scheme", because the data packet P16L or the data packet P17R has higher processing priority in the data pair producing means 2' than that of the input data packet to the node N20. However, if the content of priority information in the right input data packet P20R to the node N20 is set to "valid", processing of data packet P20R is preferentially performed in the data pair producing means 2' based on the above described "data exchanging scheme based on priority information", so that deadlock caused due to hash collision can be avoided. At that time, the content of the priority information of the data packet P20R must be set to "valid", and the content of the priority information of the left input data packet P20L to the node N20 should not be set to "valid". If the content of the priority information of the data packet P20L is set to "valid", the deadlock caused due to hash collision occurs because, for example, initial input data to the loop structure 10 is inputted from input number #2 and #n and thus, when the data packets P17R and P20L arrive, processing to the data packet P20L is preferentially formed in the data pair producing means 2' based on "data exchanging scheme based on priority information". On the other hand, if the content of priority information of the right input data packet P20R to the node N20 is set to "valid", new deadlock caused due to hash collision never occurs because the data packet P20R is not produced in the same executing stage of the loop unless execution of nodes belonging to the main block 11 and the condition determining block 12, because of connecting structure of an unwound type of a while style loop structure 10.

From the foregoing, it should be appreciated that deadlock caused due to hash collision can be avoided by adopting the following execution control scheme in execution of a while type loop structure 10 having an unwound type shown in FIG. 11.

(1) The above described "data exchanging scheme based on priority information" is adopted in the data pair producing means 2.
(2) A value of destination information for two-input node belonging to "processing prior to execution of loop structure" 14 is set to be smaller than value of the destination information for two-input node belonging to the loop structure 10 and value of the destination information for two-input node belonging to "processing after termination of execution of loop structure" 15 is set to be larger than value of destination information for two-input node belonging to the loop structure 10.
(3) Value of destination information for the two-input node belonging to the main block 11, the two-input node belonging to the condition determining block 12 and the two-input node belonging to the output selecting block 13 are set to become larger in that order of the two-input nodes.
(4) The contents of priority information of the right input data packets of two-input nodes PG and SW belonging to the outputs selecting block 13 are set to "valid" and the contents of priority information of the left input data packet of the two-input node and the input data packet to the two-input node other than the corresponding two-input node are set to "invalid".

As described in the foregoing, it is indicated by way of example that deadlock caused due to hash collision can be avoided with respect to the data flow program having a loop structure of the while type. However, according to the present invention, deadlock caused due to hash collision can be avoided in a do-while type loop structure in which the processing of the loop body is first performed and then termination of loop is determined, or a for type loop structure wherein initial value of loop control variables is first set and then termination of loop is determined, and in addition, processing of loop body is performed and then the value of loop control variables is set again.

In the description in the foregoing, information before identifying data to be processed comprises color information and destination information. Of these, the color information indicates generation number of data and the destination information indicates a number of destination of data, that is a number of operation node. However, if the data needs only one generation depending on the system specification, no color information is required. Accordingly, in such a case, hash operation is applied to the destination information, so that hash address is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processor for processing data in accordance with a data flow program, said data flow program containing a plurality of destination information, and a plurality of instruction information, and a plurality of priority information corresponding to the plurality of destination information, said data comprising a data packet which comprises a tag portion storing tag information containing at least designation information, an instruction fields storing instruction information, first and second data fields storing operand data, and an instruction information field storing priority information, comprising:

program storing means for storing said data flow program;

said program storing means reading out the destination information, the instruction information and the priority information from said data flow program in response to addressing based on the destination information in said tag of the inputted data packet, and storing the read information in the tag portion, the instruction field, and the priority information field of the data packet;

data pair producing means for detecting two data packets having the same tag information from data packets outputted from said program storing means and producing data pair;

said data pair producing means including matching memory having address space corresponding to hash address which is obtained by applying hash operation to said tag information in the data packet outputted from said program storing means;

said data pair producing means comparing the tag information in the inputted data packet with the tag information in the data packet read out from said matching memory in response to the designation of said hash address based on the tag information in the inputted data packet, and if both tag information coincide with each other, storing the operand data stored in the first data field of one data packet, in the second data field of the other data packet and outputting the other data packet, and if both information do not coincide with each other, outputting the input data packet without processing, or exchanging the input data packet with the data packet in an area of the matching memory designated by said hash address and providing an output;

said data pair producing means being responsive to said priority information of the inputted data packet and the priority information of data packet read out from the matching memory to compare both priorities for processing of production of data pair in both data packets and being responsive to the result of comparison to perform processing such that data pair production processing is performed preferentially with respect to data packet having higher priority; and operation processing means receiving the data packet outputted from said data pair producing means for providing a predetermined operation processing with respect to the received data packet;

said operation processing means decoding instruction information in the instruction field of said data packet, applying a predetermined operation processing to the operand data in said first and second data fields, storing the processed result in one data field of the data packet, and providing the data packet to said program storing means.

2. A data flow type information processor in accordance with claim 1, wherein when it is determined that said tag information as compared do not coincide with each other, said data pair producing means provides processing, as a result of comparison of priorities for data pair production processing based on said priority information, such that if the priority for data pair production processing of the data packet read out from said matching memory is determined to be higher, the inputted data packet is outputted without change, and if the priority for data pair production processing of the input data packet is determined to be higher, the input data packet is exchanged with the data packet in the area of the matching memory designated by said hash address, and the exchanged packet is outputted, and of both priorities are determined to be the same, a processing is performed in accordance with the comparison result of said tag information.

3. A data flow type information processor in accordance with claim 2, wherein if valid data is stored in the area of said matching memory designated by said hash address, said data pair producing means writes the inputted data packet into the area.

4. A data flow type information processor in accordance with claim 2, wherein said priority information is set to valid or invalid, and if only the priority information of one of the inputted data packet and the data packet read out from said matching memory is valid, said data pair producing means determines that the priority for data pair production processing of said one data packet is higher, and if both priority information of both of the data packets are invalid or valid, said data pair producing means determines that priorities for data pair production processing of both data packets are the same.

5. A data flow type information processor in accordance with claim 1, wherein said tag portion contains a color field storing color information and a destination field storing said destination information.

* * * * *